Feb. 3, 1948. S. KATZ Re. 22,969

STAY-DOWN SHIRT

Filed Sept. 25, 1947

INVENTOR
SAM KATZ
BY
Ely & Pattison
ATTORNEYS

Reissued Feb. 3, 1948

Re. 22,969

UNITED STATES PATENT OFFICE 22,969

STAY-DOWN SHIRT

Sam Katz, New York, N. Y.

Original No. 2,418,774, dated April 8, 1947, Serial No. 562,776, November 10, 1944. Application for reissue September 25, 1947, Serial No. 776,112

2 Claims. (Cl. 2—115)

This invention relates to improvements in men's outer shirts and more specifically to a shirt of the stay-down type.

This application is a continuation-in-part of my pending U. S. patent application, Serial No. 490,836, filed June 15, 1943.

The primary object of the invention resides in a shirt having means built therein which renders the same form-fitting (non-blousy), while also serving to prevent the lower portion of the shirt from riding upwardly during natural movements of a wearer.

Another feature of the invention is to provide a shirt in which the lower edges thereof are cut on the bias to define an inverted V or arched shaped rear edge and a natural V-shaped front edge when the shirt is in form-fitting engagement upon a wearer, which bias cut edges cooperate with a suitable belt stitched thereto for maintaining the lower end of the shirt down against the upward strains and stresses caused by natural body movements.

Another feature of the invention is to provide an outer shirt in which the lower front V-shaped edge thereof extends beneath the natural abdominal bulge of a male, which in conjunction with the aforesaid shaped front and rear bias cut edges, forms a more positive means of preventing upward riding of the lower portion of the shirt upon a wearer.

A further feature of the invention is the provision of a stay-down shirt which is form-fitting throughout its entire body portion to impart a neat and tidy appearance when in position upon a wearer, and which also acts to keep the undergarment from riding upwardly beneath the shirt.

Other features of the invention will become apparent as the following specification is read in conjunction with the accompanying drawings, in which Figure 1 is a front view of my stay-down shirt in position upon a wearer.

Figure 1:
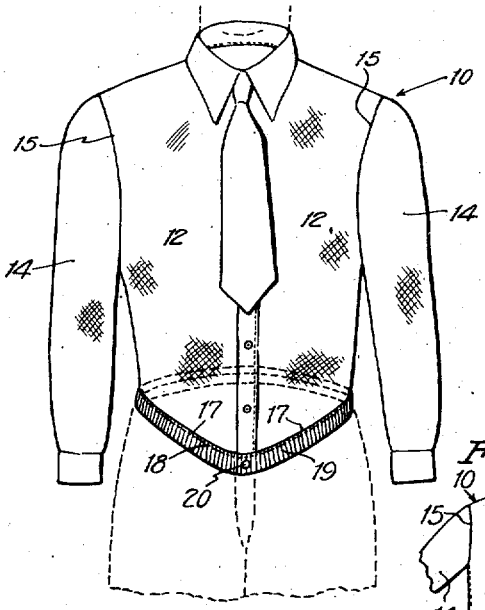

Referring to the drawings by reference characters, the numeral 10 designates a man's outer shirt which is constructed of any suitable woven fabric material which includes a body portion composed of a back section 11 and complementary buttonable front sections 12—12 connected to the back section along seams 13—13. Sleeves 14—14 are set in the front and rear sections and are connected thereto along seams 15—15.

Figure 2:
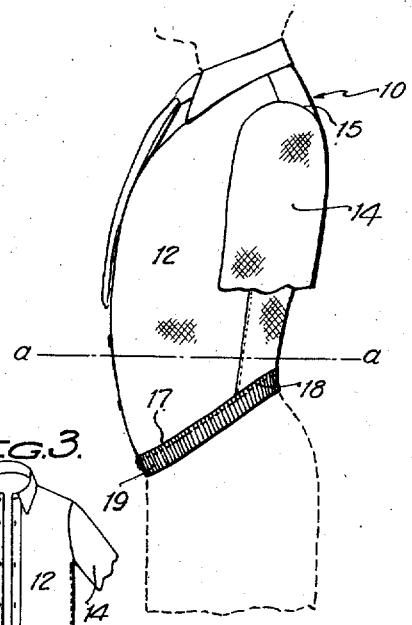
Figure 2 is a side elevational view with the sleeve broken away.
Figure 3:
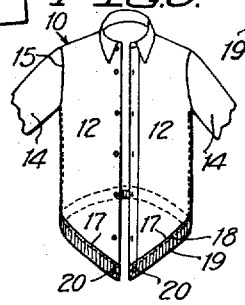
Figure 3 is a front perspective view of the shirt with the lower portion distended into form-fitting position.

When in position upon the wearer as shown in Figure 2, the lower edge of the body portion of the shirt extends below the waist line which is indicated by the line *a—a* so as to extend into the trousers, however a tail extension may be added to the lower edges of the garment, after it has been cut, shaped and otherwise formed in a manner now to be described.

Figure 4:
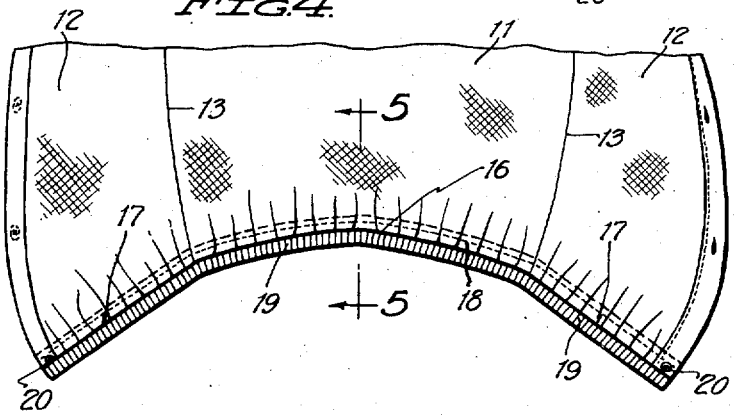
Figure 4 is a fragmentary plan view of the lower portion of the shirt spread out flat and looking at the inner side thereof.
Figure 5:
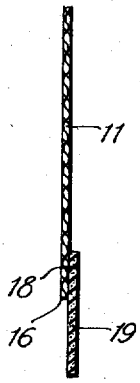
Figure 5 is an enlarged vertical sectional view on the line 5—5 of Figure 4.

The lower edge of the back section 11 is a normally substantially inverted flattened V or arched shape as at 16, the apex thereof being disposed midway of the width of the back section as best illustrated in Figure 4. The lower edges 17—17 of the front sections 12—12 are disposed at an angle to the respective angular edges of the back section and are inclined to a greater extent and meet therewith at the seams 13—13. The angle of the edges 17—17 is such that when the garment is buttoned upon a wearer as shown in Figure 1, the edges will define a V-shaped appearance. The edges 16 and 17—17 are all cut on the bias with respect to the weave of the woven fabric from which the shirt sections 11 and 12—12 are constructed.

Stitched to the outer side of the lower edges of the sections 11 and 12—12 as at 18, is a belt 19. The belt is stitched to the edges while the sections are in flat spread out position and while the belt is under a slight tension, whereupon the lower portion of the shirt is formed with gathers, however, the gathers disappear when the shirt is in position upon a wearer as illustrated in Figures 1 and 2. The belt is stitched parallel to the edges 16 and 17—17 and extends therebeyond to conceal the lower edges of the shirt from view when in worn position. The belt may be of elastic; but even if the elasticity is small or in fact altogether lacking, the belt will still serve its purpose so long as it fits fairly well around the wearer's body.

The lower free corners of the front sections 12—12 are provided with male and female snap fastener elements 20—20, although they may be a button and button-hole in keeping with the other fastening elements of the buttonable front.

When the shirt 10 is in worn position upon a wearer, the body of the same is form-fitting and comfortable with the portions of the belt paralleling the edges 17—17 defining a natural V extending forwardly and downwardly from the hips with the apex portion of the V disposed beneath the natural bulge of the stomach which is inherent in thin persons as well as those stout persons having an abdominal bulge. The belt portion paralleling the inverted V-shaped lower edge 16 of the back section 11 tends to flatten out into an arch whereupon there are gradual downwardly and forwardly converging waist-engaging edges extending from the mid-portion of the back of the shirt to the front beneath the natural stomach bulge. The belt 19 is now under tension throughout its entire length and due to its following the shape of the lower edges of the shirt, and the fact that the edges thereof are cut on the bias, and tendency of the shirt to ride upwardly due to natural body movements of a wearer is arrested. Also, the shirt is free of any fullness so as to impart a non-blousy form fitting effect.

If desired, a tail section (not shown) may be stitched to the belt 19 to extend downwardly therefrom, but such an extension would have nothing to do with the arresting of upward sliding of the skirt but merely to give added coverage to a wearer. It is the principle of the inverted V and natural V edges in conjunction with the cutting of the edges on the bias that prevents upward riding of the shirt 10 upon the body of a wearer.

While I have shown and described what I consider to be the preferred embodiment of my invention, I wish it to be understood that such changes in materials, design and construction as come within the scope of the appended claims may be resorted to if desired without departing from the spirit of my invention.

Having thus described my invention what I claim as new and desire to secure by Letters Patent is:

1. A stay-down shirt comprising a form-fitting body portion having a rear section, and front sections placed side by side and secured each along one vertical edge to the rear section, means to secure the front sections detachably together, the lower edges of said front sections being arranged to terminate adjacent the waist line of an intended wearer, said shirt being cut on the rear section to provide a substantially inverted flattened V-shaped lower rear edge beginning at a point at the middle of the rear section and extending to the sides of the rear sections and a more inclined lower edge on each front section to form a substantially V-shaped lower edge at front and rear when the front sections are secured together, the said edges on the front section extending below the natural abdominal bulge of the wearer, and a belt comprising elastic material attached to the lower edges of the front and rear sections over the whole length thereof, said belt of elastic material being stretchable in the direction of its length and serving to hold the lower edges of the body portion about the body of a wearer with the inclined front edges of the front sections disposed beneath the natural level of the stomach of the wearer's abdomen.

2. A stay-down shirt comprising a form-fitting body portion having a rear section, and front sections placed side by side and secured each along one vertical edge to the rear section, means to secure the front sections detachably together, a belt attached to said sections adjacent the lower edges thereof and arranged to lie adjacent the waist line of an intended wearer, said belt being disposed to have a substantially inverted flattened V-shaped rear portion beginning at a point at the middle of the rear section and extending to the sides of the rear sections and a more inclined part on each front section to meet and form a substantially V-shaped lower edge at the front when the front sections are secured together, the belt on the front sections extending below the natural abdominal bulge of the wearer, said belt serving to hold the lower edges of the body portion about the body of a wearer with the inclined front parts thereof disposed beneath the natural level of the stomach of the wearer's abdomen.

SAM KATZ.